May 3, 1927.
S. R. ENBERG
1,626,671
TOOL HANDLE
Filed Nov. 6, 1924
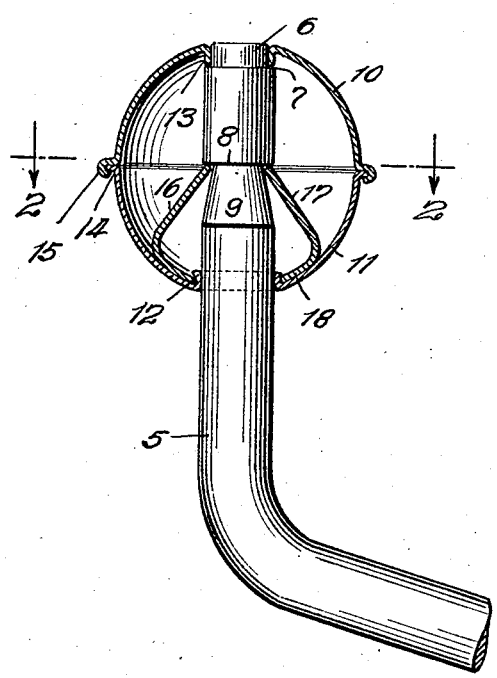
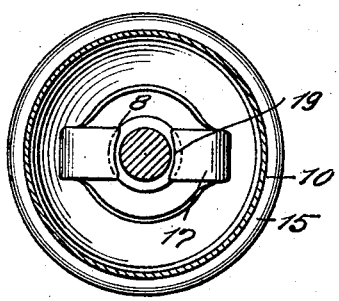
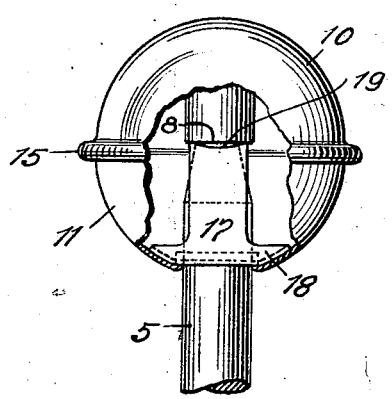
INVENTOR
STONE R. ENBERG
BY
ATTORNEYS Patented May 3, 1927.

1,626,671

UNITED STATES PATENT OFFICE.

STONE R. ENBERG, OF WORCESTER, MASSACHUSETTS, ASSIGNOR TO WALDEN-WORCESTER, INCORPORATED, OF WORCESTER, MASSACHUSETTS, A CORPORATION OF MASSACHUSETTS.

TOOL HANDLE.

Application filed November 6, 1924. Serial No. 748,034.

This invention relates to improvements in tools, and more especially to improved methods and means for mounting tool handles.

In the mounting of handles for tools, and especially revolving tools, it is of the utmost importance not only that the handle revolves freely with respect to the tool shank on which it is mounted, but that the mounting means be such that the angular, rough or projecting parts are eliminated. Such securing devices as screws, pins, nuts or locking rings are objectionable, not only by reason of their cost, but also on account of the fact that they almost invariably leave rough parts or projections on the handle. Even when these securing devices are so arranged that projections are, as far as possible, avoided, they are apt to become loosened and displaced with use of the tool, with consequent annoyance and injury to the hand of the user.

One object of the present invention is to provide securing means for a tool handle which are contained within and are incapable of projecting outside of the handle.

A further object of the invention is to provide a handle and securing means therefor constructed entirely of sheet metal.

A further object of the invention is to provide a tool handle and means for securing the handle to a shank, adapted to be formed and secured together by spinning or an equivalent operation.

With these and other objects in view, my invention consists in the novel combinations and arrangements of parts which will be hereinafter described and are illustrated in the drawings in which:

Fig. 1 is a vertical section thru my improved tool handle, showing said handle attached to the shank of a tool.

Fig. 2 is a section on the line 2—2 of Fig. 1.

Fig. 3 is an elevation of the handle in a position at right angles to the Fig. 1 position, a part of the handle proper being broken away to show the securing device.

The shank 5 to which the handle is to be secured comprises an end section 6 of reduced diameter, terminating in a shoulder 7. A second shoulder 8 is formed on the shank a short distance below the shoulder 7, and in the embodiment of the invention which has been selected for the purpose of illustration, the shank below the shoulder 8 comprises a tapered section 9.

The handle proper comprises two hemispherical shells 10 and 11, which are perforated to receive the shank 5. The perforation in the lower section or shell 11 is bounded by an inturned flange 12, and is of such diameter that the handle will turn freely on the shank 5. The perforation in the upper half 10 of the handle is surrounded by the inturned flange 13, adapted to fit loosely over the reduced end 6. The flanges 13 is of such a height that when the end thereof rests on the shoulder 7 the exterior of the handle is approximately flush with the end of the shank.

The means for securing the two sections of the handle together comprises a lip or ledge 14, extending outward from the rim of one section of the handle, and a bead 15 on the other section which is spun or otherwise turned over the lip 14, as clearly illustrated in Fig. 1.

The means for securing the handle to the shank comprises a member having extending spring fingers 16, 17, adapted to engage the shoulder 8. Integral with the fingers 16 and 17 is a clip 18 in the shape of a segment of a spherical shell, which lies adjacent the interior of the shell section 11. The segment is perforated to receive the inturned flange 12, and fits tightly about said flange.

The parts of my improved handle may be formed and secured together by any suitable methods. In a preferred method, the parts are both shaped and secured together by spinning. Blanks for the two sections of the handle are struck from sheet stock, after which the blanks are separately spun to shape. The securing member is blanked from sheet stock and spun or otherwise formed in place, and the securing fingers turned inwardly to such an extent that their ends will engage the shoulder 8 without pressing tightly on the tapered section 9 of the shank 5 below the shoulder 8. The two halves of the handle are then secured together by spinning the bead 15 over the lip 14. The shank 5 is then inserted in the handle thru the perforation in the lower section 11, the spring fingers being spread apart slightly by the part of the shank intermediate shoulders 7 and 8. As the end 6 of the shank 5 arrives at a point substantially flush with the outside of the shell, the fingers 16 and 17 spring in below the shoulder 8, securing the handle in place. The taper of the portion 9 and the convex or curved contour 19 of the ends of fingers 16 and 17 permits the fingers to retain the handle on the shank with a minimum frictional contact therewith.

The invention is not to be considered as limited to the precise form which has been described and is illustrated in the drawings, but it is to be construed as covering all equivalent devices falling within the scope of the appended claims.

I claim:

1. A swivel handle for tools comprising a pair of shell like sections, a perforation in each of said sections adapted to receive a tool shank, flanges integral respectively with said shell sections surrounding said perforations and adapted to form bearing surfaces which rotatably support said handle on said tool shank, and means within said sections for non-removably grasping said shank when said shank is inserted in the openings in said sections.

2. A swivel handle for tools comprising a pair of complementary shell sections, perforations in said sections, adapted to receive a tool shank, flanges surrounding said perforations, a securing device having a shape of a spherical segment contiguous to one of said shell sections, a perforation in said securing device surrounding one of said flanges, and fingers extending from said securing device adapted to engage a tool shank.

3. In a device of the character described, the combination of a shank having an end section of reduced diameter forming a shoulder, a second shoulder spaced from said reduced end section, a tapered portion below said second shoulder, and a handle comprising a spherical shell, a perforation in one portion of said shell adapted to fit upon said reduced end section, a perforation in the opposite portion of said shell adapted to fit around said shank and a retaining means secured adjacent said second perforation comprising spring fingers adapted to engage said second shoulder, without substantial contact with said tapered portion.

4. A swivel handle for tools, comprising a pair of complementary hemispherical shell sections, perforations of different diameter in said sections adapted to receive a tool shank having an end section of reduced diameter, forming a shoulder, a second shoulder spaced from said reduced end section, a tapered section below said second shoulder, flanges surrounding said perforations in the shell section, a securing device contiguous to one of said shell sections, a perforation in said securing device surrounding one of said flanges and spring fingers extending from said securing device adapted to engage the second shoulder of the tool shank to prevent longitudinal movement of the handle in one direction on said shank, said other flange engaging the first shoulder on the said shank to prevent longitudinal movement of the handle in the other direction.

In testimony whereof I have affixed my signature to this specification.

STONE R. ENBERG.